United States Patent [19]
Tran et al.

[11] Patent Number: 5,848,287
[45] Date of Patent: Dec. 8, 1998

[54] SUPERSCALAR MICROPROCESSOR INCLUDING A REORDER BUFFER WHICH DETECTS DEPENDENCIES BETWEEN ACCESSES TO A PAIR OF CACHES

[75] Inventors: Thang M. Tran; David B. Witt; William M. Johnson, all of Austin, Tex.

[73] Assignee: Advanced Micro Devices, Inc., Sunnyvale, Calif.

[21] Appl. No.: 603,804

[22] Filed: Feb. 20, 1996

[51] Int. Cl.⁶ ........................................................ G06F 9/38
[52] U.S. Cl. ...................... 395/800.23; 711/169; 711/132; 711/125; 711/119; 395/392; 364/716.04
[58] Field of Search ..................................... 395/567, 477, 395/376, 250, 391, 800.23, 392; 711/140, 125, 132, 169, 119; 345/506; 364/716.04

[56] References Cited

U.S. PATENT DOCUMENTS

| 4,044,338 | 8/1977 | Wolf ........................................... 365/49 |
| 4,453,212 | 6/1984 | Gaither et al. ............................. 711/2 |
| 4,807,115 | 2/1989 | Torng ....................................... 395/391 |

(List continued on next page.)

FOREIGN PATENT DOCUMENTS

| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

Primary Examiner—Eddie P. Chan
Assistant Examiner—Hong C. Kim
Attorney, Agent, or Firm—Conley, Rose & Tayon, PC; B. Noel Kivlin

[57] ABSTRACT

A superscalar microprocessor is provided which maintains coherency between a pair of caches accessed from different stages of an instruction processing pipeline. A dependency checking structure is provided within the microprocessor. The dependency checking structure compares memory accesses performed from the execution stage of the instruction processing pipeline to memory accesses performed from the decode stage. The decode stage performs memory accesses to a stack cache, while the execution stage performs its accesses (address for which are formed via indirect addressing) to the stack cache and to a data cache. If a read memory access performed by the execution stage is dependent upon a write memory access performed by the decode stage, the read memory access is stalled until the write memory access completes. If a read memory access performed by the decode stage is dependent upon a write memory access performed by the execution stage, then the instruction associated with the read memory access and subsequent instructions are flushed. Data coherency is maintained between the pair of caches while allowing stack-relative accesses to be performed from the decode stage. The comparator circuits used to perform the comparison are configured to compare a field of address bits instead of the entire address, reducing the size while still maintaining accurate dependency checking by qualifying the resulting comparison signals with an indication that both addresses hit in the same storage location within the stack cache.

19 Claims, 4 Drawing Sheets

U.S. PATENT DOCUMENTS

| | | | |
|---|---|---|---|
| 4,858,105 | 8/1989 | Kuriyama et al. | 395/582 |
| 5,148,536 | 9/1992 | Witek et al. | 711/140 |
| 5,226,126 | 7/1993 | McFarland et al. | 395/394 |
| 5,226,130 | 7/1993 | Favor et al. | 395/585 |
| 5,261,071 | 11/1993 | Lyon | 711/140 |
| 5,420,991 | 5/1995 | Konigsfeld et al. | 711/150 |
| 5,434,987 | 7/1995 | Abramson et al. | 395/567 |
| 5,442,757 | 8/1995 | McFarland et al. | 395/394 |
| 5,467,473 | 11/1995 | Kahle et al. | 395/800.23 |
| 5,471,598 | 11/1995 | Quattromani et al. | 711/122 |
| 5,577,200 | 11/1996 | Abramson et al. | 395/185.03 |
| 5,588,126 | 12/1996 | Abramson et al. | 395/376 |
| 5,606,670 | 2/1997 | Abramson et al. | 711/154 |
| 5,619,408 | 4/1997 | Black et al. | 395/567 |
| 5,634,068 | 5/1997 | Nishtala | 711/141 |

400 →

| V 401 | Instruction 402 | Address 403 | Control & Result 404 | SC-Hit 405 | SC-Way 406 |

| TAG 411 | STATUS 412 | SC-Hit 413 | SC-Way 414 |

FIG. 5

SUPERSCALAR MICROPROCESSOR INCLUDING A REORDER BUFFER WHICH DETECTS DEPENDENCIES BETWEEN ACCESSES TO A PAIR OF CACHES

BACKGROUND OF THE INVENTION

1. Field of the Invention

This invention is related to the field of superscalar microprocessors and, more particularly, to dependency checking structures for detecting dependencies between accesses to a pair of caches employed within a superscalar microprocessor.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. At the end of a clock cycle, the resulting values are moved to the next pipeline stage.

Since superscalar microprocessors execute multiple instructions per clock cycle and the clock cycle is short, a high bandwidth memory system is required to provide instructions and data to the superscalar microprocessor (i.e. a memory system that can provide a large number of bytes in a short period of time). Without a high bandwidth memory system, the microprocessor would spend a large number of clock cycles waiting for instructions or data to be provided, then would execute the received instructions and/or the instructions dependent upon the received data in a relatively small number of clock cycles. Overall performance would be degraded by the large number of idle clock cycles. However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are storage devices containing multiple blocks of storage locations, configured on the same silicon substrate as the microprocessor or coupled nearby. The blocks of storage locations are used to hold previously fetched instruction or data bytes. The bytes can be transferred from the cache to the destination (a register or an instruction processing pipeline) quickly; commonly one or two clock cycles are required as opposed to a large number of clock cycles to transfer bytes from a DRAM main memory.

Caches may be organized into an "associative" structure (also referred to as "set associative"). In an associative structure, the blocks of storage locations are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The act of selecting a row via an index is referred to as "indexing". The addresses associated with bytes stored in the multiple blocks of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses".

Several blocks of memory are configured into a row of an associative cache. Each block of memory is referred to as a "way"; multiple ways comprise a row. The way is selected by providing a way value to the cache. The way value is determined by examining the tags for a row and finding a match between one of the tags and the requested address. A cache designed with one way per row is referred to as a "direct-mapped cache". In a direct-mapped cache, the tag must be examined to determine if an access is a hit, but the tag examination is not required to select which bytes are transferred to the outputs of the cache. Since only an index is required to select bytes from a direct-mapped cache, the direct-mapped cache is a "linear array" requiring only a single value to select a storage location within it.

A high bandwidth memory system is particularly important to a microprocessor implementing the x86 microprocessor architecture. The x86 architecture implements a relatively small register set including several registers which are not general purpose. Registers which are not general purpose may not be used to store an arbitrary value because the value they store has a specific interpretation for certain instructions. Consequently, many data values which a program is manipulating are stored within a stack. As will be appreciated by those of skill in the art, a stack is a data storage structure implementing a last-in, first-out storage mechanism. Data is "pushed" onto a stack (i.e. the data is stored into the stack data structure) and "popped" from the stack (i.e. the data is removed from the stack data structure). When the stack is popped, the data removed is the data that was most recently pushed. The ESP register of the x86 architecture stores the address of the "top" of a stack within main memory. The top of the stack is the storage location which is storing the data that would be provided if the stack is popped.

Since data on the stack is manipulated often, it would be advantageous to provide relatively quick access to data on the stack. In particular, accessing stack data as early as possible in the instruction processing pipeline may improve microprocessor performance by allowing instructions which access the stack to fetch their operands early. As used herein, the term "instruction processing pipeline" refers to a pipeline which performs instruction processing. Instruction processing includes fetching, decoding, executing, and writing the results of each instruction. An instruction processing pipeline is formed by a number of pipeline stages in which portions of instruction processing are performed. Typically, memory operands (both stack and non-stack) are accessed from the execute stage of the instruction processing pipeline. As used herein, the term "operand" refers to a value which an instruction is intended to manipulate. Operands may be memory operands (which are stored in memory) or register operands (which are stored in registers).

Certain types of addressing employed by x86 instructions indicate that an access to stack data is occurring. However, other types of addressing employed by x86 instructions do not indicate a stack access. These types of addressing may still access data on the stack, since the stack is a block of memory in the x86 architecture and memory is accessible via any type of addressing. In particular, the various addressing modes may indicate accesses to the same address. Coherency of the data stored at the address must be maintained such that a write to the address is reflected in data later read from that address. A structure which allows access to stack data prior to the execute stage of the instruction processing pipeline while still maintaining coherency between various addressing modes of instructions is desired.

SUMMARY OF THE INVENTION

The problems outlined above are in large part solved by a microprocessor employing a dependency checking structure according to the present invention. The dependency checking structure compares memory accesses performed by the load/store unit (from the execution stage of the instruction processing pipeline) to memory accesses performed by a plurality of decode units (the decode stage of the instruction processing pipeline). The decode units perform memory accesses to a stack cache which stores data associated with stack-relative accesses, while the load/store unit performs its accesses to the stack cache and to a data cache. If a read memory access performed by the load/store unit is dependent upon a write memory access performed by the decode units, the read memory access is stalled until the write memory access completes. If a read memory access performed by a decode unit is dependent upon a write memory access performed by the load/store unit, then the instruction associated with the read memory access and subsequent instructions are flushed. Advantageously, data coherency is maintained between the pair of caches while allowing stack-relative accesses to be performed from the decode stage of the instruction processing pipeline of the microprocessor.

Additionally, the comparator circuits used to perform the comparison are beneficially configured to compare a field of address bits instead of the entire address. The comparator circuits may be significantly smaller (in terms of silicon area) than comparators which operate upon the entire address. The dependency comparison is performed accurately, however, by qualifying the resulting comparison signals with an indication that both addresses hit in the same storage location within the stack cache. Hitting in the same storage location indicates that the tags of the two addresses are equal, and therefore the addresses are equal if the index and offset bits are compared. Dependencies are accurately detected by the dependency checking structure while advantageously reducing the size of the comparator circuits with respect to previous dependency checking structures. The microprocessor may thereby be fabricated upon a smaller silicon substrate, advantageously decreasing costs.

Broadly speaking, the present invention contemplates a superscalar microprocessor comprising a first cache, a second cache, and a reorder buffer. The first cache is accessed from a first stage of an instruction processing pipeline. Similarly, the second cache is accessed from a second stage of the instruction processing pipeline. An instruction progressing through the instruction processing pipeline arrives at the second stage subsequent to arriving at the first stage. Coupled to both the first and second caches, the reorder buffer is configured to store a plurality of instructions and an indication corresponding to each one of the plurality of instructions. The indication is indicative that a first memory access corresponding to one of the plurality of instructions hits in the first cache. The reorder buffer is further configured to monitor a second memory access to the second cache and to detect dependencies between the first memory access and the second memory access when the first memory access hits in the first cache.

The present invention further contemplates a superscalar microprocessor comprising a stack cache, a data cache, a reorder buffer, a plurality of decode units, and a load/store unit. The stack cache is configured to store data bytes associated with stack-relative memory accesses, while the data cache is configured to store data bytes associated with any memory accesses. The reorder buffer includes a request bus coupled to the load/store unit for receiving access addresses from the load/store unit. The reorder buffer also includes a plurality of storage locations for storing information pertaining to an instruction. The information includes an address of an operand. Coupled to the plurality of storage locations is a plurality of comparator circuits configured to receive the stored addresses. Each comparator circuit is coupled to the request bus, and produces a comparison signal indicative of equality between a field of the stored address and a corresponding field of the access address. The control unit is coupled to the storage locations, the request bus, the comparator circuits, and a dependency bus. The control unit is configured to convey a dependency signal indicative of a dependency between the access address and the address; the dependency being determined according to the comparison signals. The dependency signal is conveyed upon a dependency bus. Configured to decode instructions, the plurality of decode units are coupled to the dependency bus. Also coupled to the dependency bus is the load/store unit, which is configured to execute read and write memory accesses. The load/store unit is additionally coupled to the data cache and to the stack cache.

BRIEF DESCRIPTION OF THE DRAWINGS

Other objects and advantages of the invention will become apparent upon reading the following detailed description and upon reference to the accompanying drawings in which:

FIG. 4 is a diagram showing information stored within each of the plurality of storage locations shown in FIG. 3.

FIG. 5 is a diagram showing information stored in a tag storage within the data cache shown in FIGS. 1 and 2.

Figure 1:
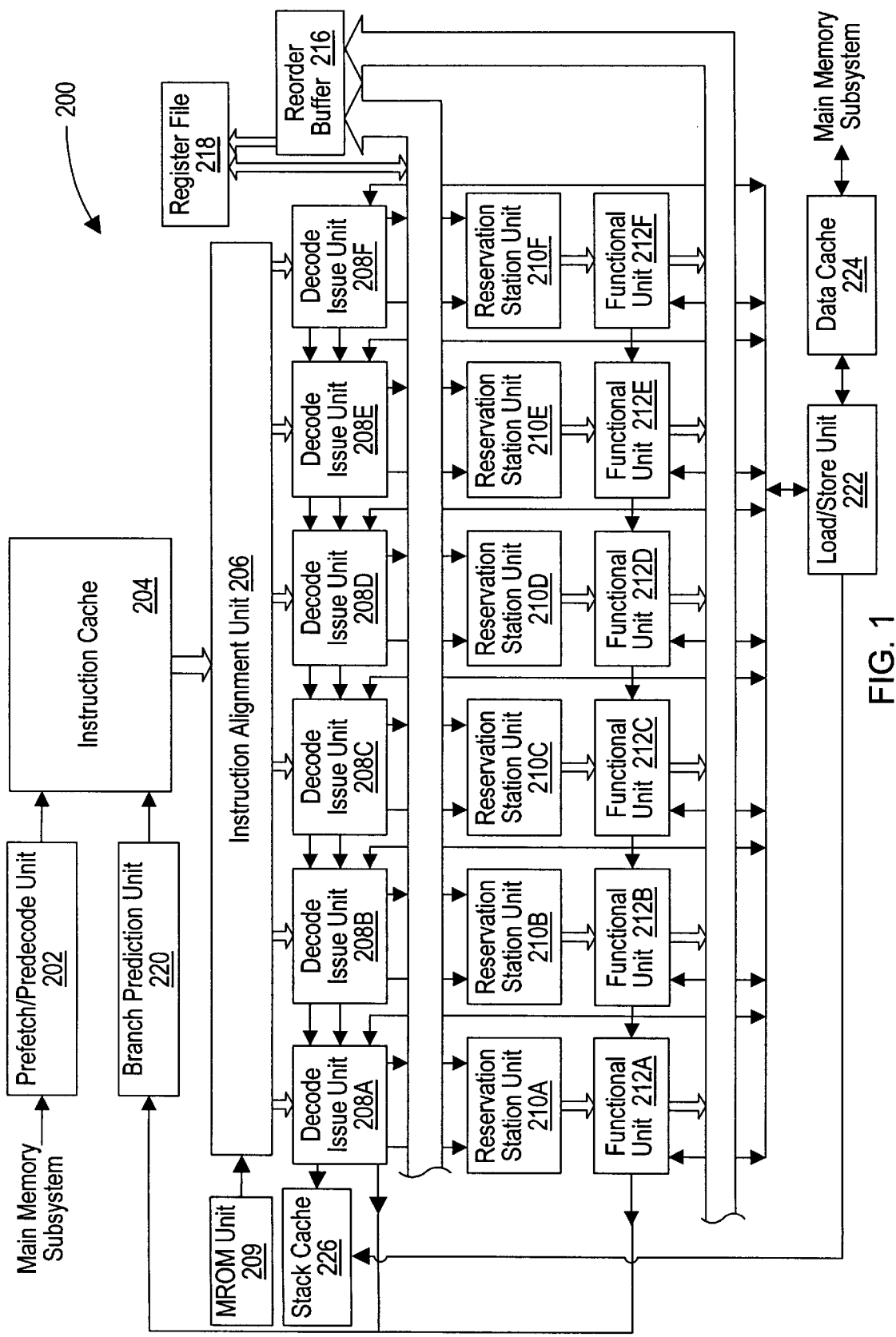
FIG. 1 is a block diagram of a superscalar microprocessor including a reorder buffer, stack cache, data cache, and load/store unit according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a superscalar microprocessor 200 including a stack cache 226, a data cache 224, a load/store unit 222, and a reorder buffer 216 in accordance with the present invention is shown. As illustrated in the embodiment of FIG. 1, superscalar microprocessor 200 includes a prefetch/predecode unit 202 and a branch prediction unit 220 coupled to an instruction cache 204. Instruction alignment unit 206 is coupled between instruction cache 204 and a plurality of decode units 208A–208F (referred to collectively as decode units 208). Each decode unit 208A–208F is coupled to respective reservation station units 210A–210F (referred to collectively as reservation stations 210), and each reservation station 210A–210F is coupled to a respective functional unit 212A–212F (referred to collectively as functional units 212). Decode units 208, reservation stations 210, and functional units 212 are further coupled to a reorder buffer 216, a register file 218 and a load/store unit 222. A data cache 224 is shown coupled to load/store unit 222, and an MROM unit 209 is shown coupled to instruction alignment unit 206. Finally, stack cache 226 is coupled to load/store unit 222, decode units 208, data cache 224, and reorder buffer 216.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data.

TABLE 1

Encoding of Start, End and Functional Bits

| Instr. Byte Number | Start Bit Value | End Bit Value | Functional Bit Value | Meaning |
|---|---|---|---|---|
| 1 | 0 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | Mod R/M or SIB byte |
| 3–8 | 0 | X | 1 | Displacement or immediate data; the second functional bit set in bytes 3–8 indicates immediate data |
| 1–8 | X | 0 | X | Not last byte of instruction |
| 1–8 | X | 1 | X | Last byte of instruction |

As stated previously, in one embodiment certain instructions within the x86 instruction set may be directly decoded by decode units 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation.

Instruction alignment unit 206 is provided to channel variable byte length instructions from instruction cache 204 to fixed issue positions formed by decode units 208A–208F. In one embodiment, instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the dependency checking structure formed by stack cache 226, data cache 224, load/store unit 222, and reorder buffer 216, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208F routes displacement and immediate data to a corresponding reservation station unit 210A–210F. Output signals from the decode units 208 include bit-encoded execution instructions for the functional units 212 as well as operand address information, immediate data and/or displacement data.

Decode units 208 additionally detect "stack-relative" memory accesses. As used herein, a "stack-relative" memory access is a memory access utilizing an addressing mode that is indicative of a stack access (as defined in the x86 architecture, for example). In one embodiment, a stack-relative memory access is a memory access in which the address is formed using the value stored in the ESP or EBP registers of the x86 architecture along with a possible offset specified by the instruction. The offset may be immediate data provided with the instruction. Decode units 208 are capable of generating a current ESP or EBP value even though some instructions prior to the instructions being decoded may not have executed yet. Exemplary hardware for this function is described in the commonly assigned, co-pending patent application entitled: "A Lookahead Register Value Generator and a Superscalar Microprocessor Employing the Same", Ser. No. 08/480,092 filed Jun. 7, 1995 by Pflum. The disclosure of this patent application is incorporated herein by reference in its entirety. If a particular decode unit 208A–208F detects a stack-relative memory access, then the decode unit generates the address associated with the stack-relative memory access and conveys the address to stack cache 226. If the data exists within stack cache 226 and the memory access is a read, the data is transferred to the respective reservation station 210A–210F. Advantageously, stack-relative memory accesses occur in the decode stage of the instruction processing pipeline. A memory access may be a read access, in which bytes are transferred from memory to a destination specified by the instruction, or a write access, in which bytes are transferred from a source specified by the instruction to memory. The location in memory referenced by the access is determined by the access address associated with the access.

A "non-stack-relative" memory access is a memory access utilizing an addressing mode which is not indicative of a stack access. However, non-stack-relative memory accesses may access the stack. In the x86 architecture, for example, indirect addressing utilizing a register other than the ESP or EBP registers is a non-stack-relative memory access. As will be appreciated by those skilled in the art, indirect addressing is an addressing mode wherein the address is formed from the value stored in a register. In some cases, the address is formed by adding the value in the register to an offset provided with the instruction. The offset may be directly provided with the instruction, or indirectly through a register. The x86 architecture includes several registers, for example an EAX register, which may be used to provide the address of an operand via indirect addressing. If the EAX register specifies an address within the stack (as located by the ESP register), then a dependency may exist between the memory access specified by the EAX register and memory accesses generated from the ESP or EBP registers. Microprocessor 200 additionally classifies memory accesses having an address formed from the ESP or EBP registers and an indirect value stored in another register as non-stack-relative memory accesses. In one embodiment, decode units 208 are not configured to generate an address for a non-stack-relative memory access. Instead, these addresses are generated by functional units 212 during a subsequent clock cycle.

The superscalar microprocessor 200 of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208F are routed directly to respective reservation station units 210A–210F. In one embodiment, each reservation station unit 210A–210F is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A–208F is associated with a dedicated reservation station unit 210A–210F, and that each reservation station unit 210A–210F is similarly associated with a dedicated functional unit 212A–212F. Accordingly, six dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

It is noted that in one embodiment, the bit-encoded execution instructions comprise several one-hot encodings. A one-hot encoding includes values in which at most one bit of the value is set. For example, a one-hot encoding configured to assume eight different values is eight bits wide. Each one of the eight bits being set while the other seven bits are clear is indicative of a particular one of the eight values. Since no bits of a one-hot bit-encoded instruction are combined to determine the indicated instruction, the one-hot encoding may reduce the number of cascaded levels of logic used to perform the instruction within a functional unit 212. It is further noted that in one embodiment, the bit-encoded execution instructions are physically stored within the functional units 212.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222 or stack cache 226.

Reorder buffer 216 is additionally responsible for completing stack-relative write accesses to stack cache 226. When an instruction which writes a stack memory location within stack cache 226 retires, reorder buffer 216 conveys the data bytes to be written to stack cache 226. An instruction "retires" when prior instructions have completed without causing an exception and the instruction's results are written to stack cache 226, data cache 224, or register file 218. If stack cache 226 is written to, it stores the data bytes in the appropriate storage location. During a later clock cycle, stack cache 226 may discard a cache line containing data bytes written in this fashion. At the time the data bytes are removed from stack cache 226, they are transferred to data cache 224.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146, 382, filed Oct. 29, 1993 by Witt, et al., which is continued through a continuation in part filed on Apr. 26, 1994, now U.S. Pat. No. 5,574,928. These documents are incorporated herein by reference in their entirety.

Reservation station units 210A–210F are provided to temporarily store instruction information to be speculatively executed by the corresponding functional units 212A–212F. As stated previously, each reservation station unit 210A–210F may store instruction information for up to three pending instructions. Each of the six reservation stations 210A–210F contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212F, the result of that instruction is passed directly to any reservation station units 210A–210F that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210F has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210F where pending instructions may be waiting for the results of previous instruction executions to obtain the required operand values.

Generally speaking, load/store unit 222 provides an interface between functional units 212A–212F and data cache 224. In one embodiment, load/store unit 222 is configured with a load/store buffer with eight storage locations for data and address information for pending loads or stores. Decode units 208 arbitrate for access to load/store unit 222 in order to place non-stack-relative memory accesses as well as stack-relative memory accesses that may not be completed by stack cache 226 into the load/store buffer. When the buffer is full, a decode unit must wait until the load/store unit 222 has room for the pending load or store request information. Load/store unit 222 also performs dependency checking for load memory accesses against pending store memory accesses to ensure that data coherency is maintained.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Stack cache 226 is a high speed cache memory provided to temporarily store stack data. In one embodiment, stack cache 226 is configured to store eight lines of 32 bytes each. It is understood that stack cache 226 may be implemented in a direct-mapped, set-associative, or fully associative configuration. Data stored within stack cache 226 may also be stored within data cache 224. When a stack-relative memory access is detected by a decode unit 208 and the associated data is not stored within stack cache 226, then the associated data is transferred to stack cache 226 from data cache 224. Additionally, if the line being replaced within stack cache 226 contains data bytes that are the result of a write access, the replaced line is conveyed to data cache 224. It is noted that such a transfer may be accomplished similar to the disclosure of: "A Method for Transferring Data Between a Pair of Caches Configured to be Accessed from Different Stages of an Instruction Processing Pipeline" filed concurrently herewith by Tran, et al., filed Nov. 20, 1995, Ser. No. 08/561,073. The disclosure of this patent application is incorporated herein by reference in its entirety.

Figure 2:
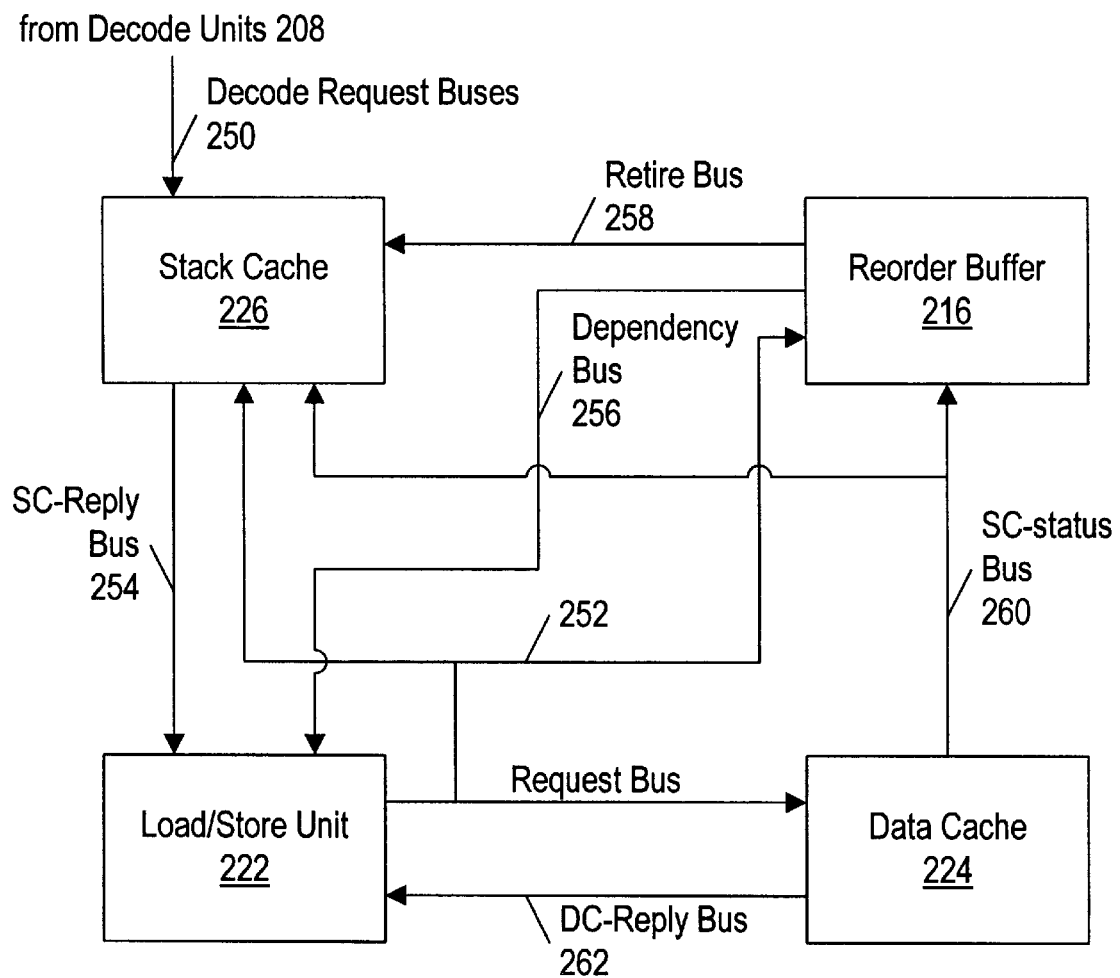
FIG. 2 is a block diagram of the reorder buffer, stack cache, data cache, and load/store unit shown in FIG. 1, highlighting the interconnection between these units according to one embodiment of the present invention.

Turning now to FIG. 2, a block diagram of stack cache 226, data cache 224, reorder buffer 216, and load/store unit 222 is shown to highlight the interconnections between these units according to one embodiment of the present invention. The interconnections include: a decode request bus 250 coupled between decode units 208 (shown in FIG. 1) and stack cache 226; a request bus 252 coupled between load/store unit 222 and stack cache 226, data cache 224, and reorder buffer 216; an SC_reply bus 254 coupled between stack cache 226 and load/store unit 222; a dependency bus 256 coupled between reorder buffer 216 and load/store unit 222 (and also coupled to reservation stations 210 and decode units 208 for receiving flush requests from reorder buffer 216); a retire bus 258 coupled between reorder buffer 216 and stack cache 226; an SC_status bus 260 coupled between data cache 224, reorder buffer 216 and stack cache 226; and a DC_reply bus 262 coupled between data cache 224 and load/store unit 222.

Generally speaking, decode units 208 detect stack-relative memory accesses with respect to instructions being decoded during a clock cycle and convey read or write memory accesses to stack cache 226 upon decode request buses 250. If data associated with a read memory access is stored within stack cache 226, then stack cache 226 conveys the data to the respective reservation station 210 associated with the decode unit 208 making the request. Load/store unit 222 performs non-stack-relative memory accesses (and those stack-relative memory accesses for data not stored in stack cache 226) to data cache 224 and to stack cache 226. Non-stack-relative memory accesses may access memory locations within the stack. Therefore, dependency checking is performed between stack-relative memory accesses (which occur from the decode stage of the instruction processing pipeline) and non-stack-relative memory accesses (which occur from the execution stage of the instruction processing pipeline). Because the accesses occur from different pipeline stages, instructions which are relatively close to each other in a program may perform their memory accesses at significantly different times. Additionally, the speculative nature of microprocessor 200 dictates that read memory accesses may occur in an arbitrary order. A dependency checking structure for stack cache 226 and data cache 224 within a microprocessor 200 is employed to detect dependencies between the accesses. A memory access (read or write) is "dependent" upon a prior memory access if the memory access reads or writes data bytes that the prior memory access writes. If the both memory accesses are read memory accesses, then there is no dependency since neither memory access changes the accessed data bytes. Dependency checking refers to the process of detecting the above mentioned dependencies.

The dependency checking structure described herein compares accesses conveyed upon request bus 252 to access addresses stored with each instruction within reorder buffer 216. In one embodiment, a field of address bits are compared instead of the full address. As used herein, a field of address bits refers to a set of contiguous bits within the address. If the comparison indicates equality, then a dependency may exist if the instruction within reorder buffer 216 includes a stack-relative access. This information (along with an indication of which storage locations within reorder buffer 216 store the two instructions being compared) is sufficient to indicate which memory accesses are dependent on prior memory accesses and what the program order of the accesses are. As used herein, the term "program order" refers to the order in which instructions of a program would be executed if each instruction were fetched, decoded, executed, and results written before the next instruction were fetched. If a stack-relative read access is detected to be dependent upon a non-stack-relative write access, then the instruction processing pipeline is flushed from the non-stack-relative read access instruction to the decode stage. As used herein, the term "flush" refers to discarding an instruction along with any results it may have computed. A flush is performed in this case because the stack-relative read access received incorrect data when it accessed stack cache 226 during a prior clock cycle. If a non-stack-relative read access is dependent on a stack-relative write access, then the non-stack-relative read access is stalled (i.e. not performed) until the stack-relative write access has written its data. Flushing and stalling are exemplary corrective actions which may be taken upon discovery of stack-relative to non-stack-relative dependencies.

Dependency checking between stack-relative and non-stack-relative memory accesses may be better understood with respect to Table 2 below. Table 2 depicts each of the possible memory dependency checking scenarios. A DC_read is a read access performed at the execution stage of the instruction processing pipeline. A DC_write is a write access performed at the execution stage of the instruction processing pipeline. An SC_read and SC_write are a read and a write access (respectively) performed at the decode stage of the instruction processing pipeline. DC_read and DC_write are performed to both data cache 224 and stack cache 226, while SC_read and SC_write are performed only to stack cache 226. An operation has a potential dependency if it is performed after another operation in program order. Table 2 shows the operation occurring first in program order as its rows, and the operation occurring second in program order as its columns. Each entry in the table indicates the unit responsible for detecting dependencies when the column operation is performed after the row operation (in program order).

TABLE 2

Dependency Checking Scenarios

|  |  | SC_read | SC_write | DC_read | DC_write |
|---|---|---|---|---|---|
| After: | SC_read | none | ROB | none | ROB |
|  | SC_write | ROB | ROB | ROB2 | ROB |
|  | DC_read | none | ROB | none | LS |
|  | DC_write | ROB2 | ROB | LS | ROB | none: read after read is not a dependency since the data is not changed.
ROB: The reorder buffer causes writes to be performed in program order. A DC_write which is after an SC_write within the same reorder buffer line is marked in reorder buffer 216 as an SC_write when the write is performed by load/store unit 222. Additionally, SC_read after SC_write is handled via renaming and forwarding between functional units (based on linear address) similar to register renaming and forwarding. In another embodiment, SC_read after SC_write dependencies are handled similar to load/store unit 222 (described below). Since writes are not performed speculatively, write after read is performed in order.
LS: Load/store unit 222 correctly orders DC_read and DC_write accesses. DC_read and DC_write accesses are stored into the load/store buffer in program order. When a read is performed out of order, its address is compared with the write addresses of instructions prior to the read. If a write address is not available, then a dependency is assumed until the address is available. When a dependency is detected, the read is delayed until the operation upon which it depends receives data. The data is then forwarded as the read data.
ROB2: Reorder buffer 216 performs the dependency checking as described below with respect to FIG. 3.

In one embodiment, retire bus 258 is employed by reorder buffer 216 to convey stack-relative write accesses to stack cache 226 for storing of the data associated with these write accesses when the instruction is retired. A stack-relative write accesses stack cache 226 when it occupies the decode stage of the instruction processing pipeline, but does not perform the writing of data bytes until the instruction is retired by reorder buffer 216. Dependency bus 256 conveys signals indicative of a dependency between a request conveyed upon request bus 252 and an access address stored within reorder buffer 216. Additionally, dependency bus 256 conveys a flush request from reorder buffer 216 due to a stack-relative read access that was performed in a previous clock cycle and is determined to be dependent upon a non-stack-relative write access performed during the current clock cycle. In one embodiment, the flush request includes a value indicative of the reorder buffer storage location which stores the stack-relative read access. Each reorder buffer storage location following the read access is flushed by reorder buffer 216, load/store unit 222, reservation stations 210 and decode units 208.

Load/store unit 222 employs request bus 252 for conveying read and write accesses to stack cache 226, data cache 224, and reorder buffer 216. Replies associated with these read and write accesses (including data) are returned from stack cache 226 on SC_reply bus 254. Data associated with the read and write accesses (along with stack and data cache hit information) are returned from data cache 224 on DC_reply bus 262. Additionally, data cache 224 conveys stack cache hit information on SC_status bus 260 to reorder buffer 216 for use in dependency checking and to stack cache 226 for use in conveying data upon stack cache reply bus 254. In particular, the way of stack cache 226 in which the requested data is stored is used by stack cache 226 to select data to convey SC_reply bus 254.

Figure 3:
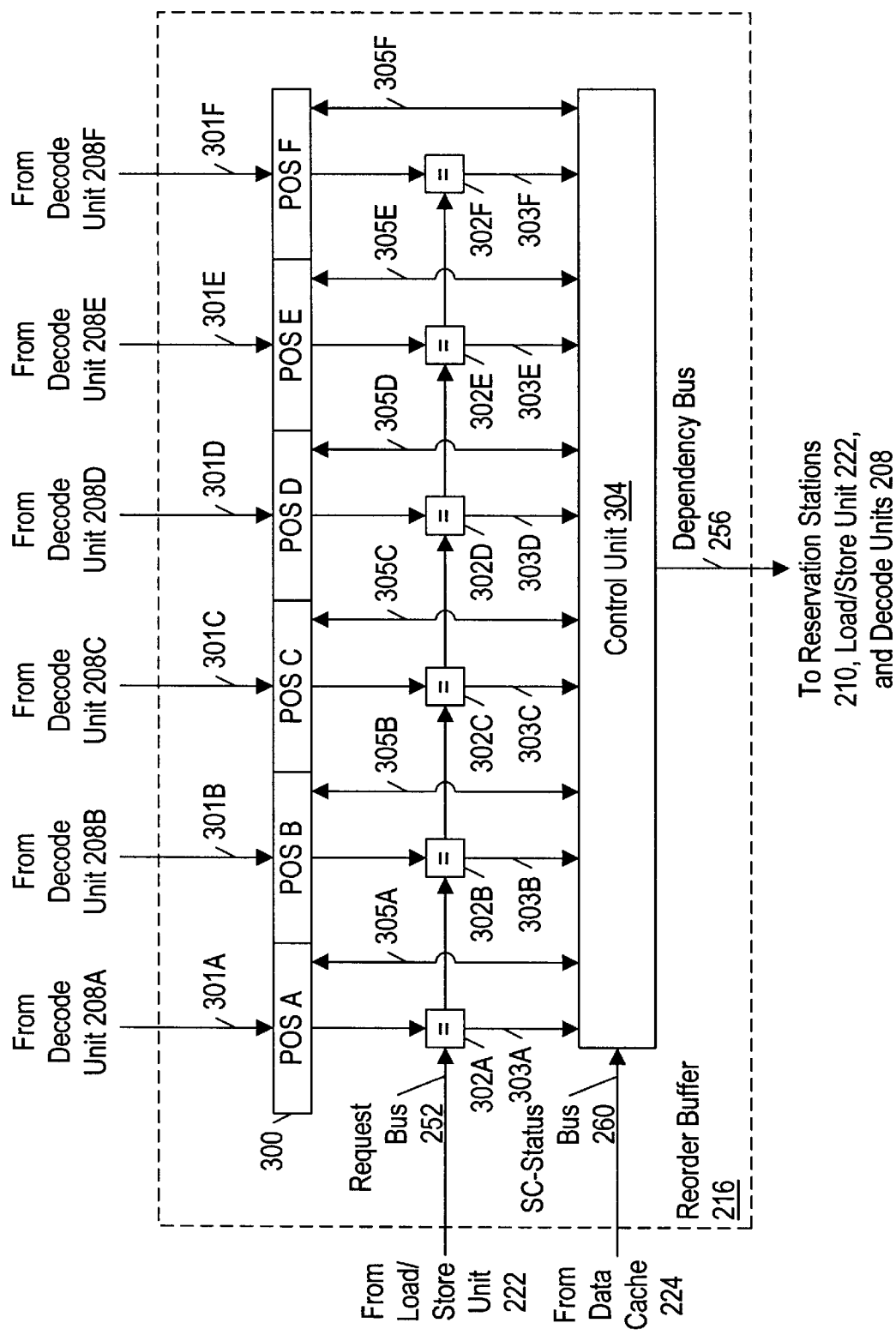
FIG. 3 is a block diagram of the reorder buffer shown in FIG. 1, including a plurality of storage locations for instructions.

Turning now to FIG. 3, a block diagram of reorder buffer 216 is shown. For simplicity, one line 300 of storage locations is shown. However, reorder buffer 216 is configured with multiple lines of storage locations configured similar to line 300. A "line" of storage locations is a group of storage locations storing instructions which were decoded during the same clock cycle. Since the embodiment of microprocessor 200 shown in FIG. 1 includes six decode units, six storage location comprise line 300 in FIG. 3. The six storage locations are labeled POS A through POS F, and each location is associated with a respective decode unit 208A–208F. Decode instructions are transferred to reorder buffer 216 across decoded instruction buses 301A–301F.

Each storage location within line 300 is coupled to a comparator circuit (shown as reference numbers 302A–302F). Comparator circuits 302 are configured to compare a field of an address stored within the respective reorder buffer storage location to a field of an access address conveyed upon request bus 252. A set of comparator circuits 302 is included for each access address which may be conveyed upon request bus 252 during a clock cycle. In one embodiment, load/store unit 222 is configured to convey two requests upon request bus 252 during a clock cycle. If the fields compare equal, then a comparison signal is activated upon a respective comparison conductor 303A–303F. Comparison conductors 303 are coupled to a control unit 304. Also coupled between control unit 304 and each of the reorder buffer storage locations within line 300 is a control bus 305A–305F. Control buses 305 convey signals indicative of control commands to line 300, as well as modifications to data stored within each storage location (as determined by control unit 304). Additionally, the values stored within each storage location are conveyed to control unit 304 form line 300 across control buses 305.

Control unit 304 receives the comparison signals from comparator circuits 302, as well SC_status bus 260 from load/store unit 222. Values conveyed upon SC_status bus 260 include an indication of whether or not the requested address hits in stack cache 226, and which way of stack cache 226 the hit occurs in. In embodiments in which stack cache 226 is direct-mapped, the way indication is not included. Additionally, a value indicative of the reorder buffer storage location storing the instruction associated with the access address and an indication of the read or write nature of the access are conveyed upon SC_status bus 260. Control unit 304 maintains a head and tail pointer indicative of which reorder buffer line contains the oldest (or least recently dispatched) instructions and which reorder buffer line contains the most recently dispatched instructions. With this information, control unit 304 may determine which instruction occurs first in program order when a comparison signal indicates a possible dependency between the access address and an address stored within reorder buffer 216.

In one embodiment, a dependency signal is asserted on dependency bus 256 by control unit 304 if a read access is conveyed on request bus 252 and a prior stack-relative write access is stored within reorder buffer 216. Load/store unit 222 is configured to receive the dependency signal and to stall the associated instruction until the stack-relative write access is retired. A pointer bus (not shown) coupled between load/store unit 222 and reorder buffer 216 indicates the oldest instruction which performs a memory access. Load/store unit 222 uses this pointer to determine when to perform a write access as well as when to reattempt a read access which is stalled due to the above mentioned dependency.

If load/store unit 222 is conveying a write access and the dependency signal is asserted (due to a stack-relative read access dependent upon the write access), then load/store unit 222 completes the write access normally. In addition, an indication of the storage location within reorder buffer 216 storing the stack-relative read access which should be flushed (along with instructions subsequent to that instruction) is conveyed on dependency bus 256. Load/store unit 222 discards any instructions it may be storing subsequent to indicated instruction. Flushing is performed because the stack-relative read access received incorrect data when it was performed, and so the flushed instruction operated incorrectly (as well as any instructions dependent upon the flushed instruction). Reservation stations 210 and decode units 208 additionally receive the flush request and flush any indicated instructions.

In one embodiment, the field of address bits compared by comparator circuits 302 includes the seven least significant bits of the address. This embodiment is associated with a two-way associative stack cache having eight lines of 32 bytes. The least significant five bits of the address identify the accessed bytes within the 32 byte line, so that the addresses being compared are known to overlap. The remaining two bits are the index bits into stack cache 226. Two bits are used since stack cache 226 is two way associative with eight lines, yielding four rows of two columns.

In another embodiment associated with a direct-mapped eight line stack cache, the field of address bits compared by comparator circuits 302 is the eight least significant bits of the address. Similar to the above embodiment, the least significant five bits of the address identify the accessed bytes within the line. Since stack cache 226 is direct mapped, the remaining three bits form the index into the eight-row stack cache.

For either embodiment, the comparison performed by comparator circuits 302 identifies whether or not the access address conveyed on request bus 252 and the addresses stored within reorder buffer 216 index the same row of stack cache 226 and access the same bytes within that index. Additional instruction information is stored within the storage locations of reorder buffer 216, including the hit/miss status of the associated address and the way of stack cache 226 which hit (for associative embodiments).

Control unit 304 examines the additional instruction information along with the information conveyed on SC_status bus 260 to determine if the associated dependency signal upon dependency bus 256 should be activated. A dependency may exist between the access address conveyed on request bus 252 and the address stored within a reorder buffer storage location if: (i) the access address hits in stack cache 226, as indicated by SC_status bus 260; (ii) the additional instruction information indicates that the address stored in the reorder buffer storage location hit in stack cache 226 during a previous clock cycle; (iii) the two addresses hit in the same way of stack cache 226, as indicated by the additional instruction information and SC_status bus 260; and (iv) the comparison performed by the associated comparator 302A–302F indicates equality. A dependency exists if the above conditions are true and an analysis of program order and type of access indicates that the memory access which is first in program order is a store memory access and the memory access which is second in program order is a load memory access. The dependency is known to exist because the two addresses hitting in the same way indicates that the tags associated with the two addresses are the same, and the index and offset bits are being compared by comparator circuits 302.

If one of the above mentioned addresses hits in stack cache 226 but the other address misses or hits in a different way, then no dependency exists. Similar to the above, the dependency is known not to exist because the tags associated with the two addresses are different. If both of the aforementioned addresses miss stack cache 226, then a dependency may exist. In this case, it is unclear whether or not a dependency exists since the full address compare has not been performed and it is not clear whether or not the tags are the same. However, stack-relative memory accesses which miss stack cache 226 are performed by load/store unit 222. Therefore, the case in which both addresses miss stack cache 226 is handled by the dependency checking performed by load/store unit 222. It is noted that data cache 224 stores the stack cache hit/miss status of each line as well as the way of stack cache 226 within which the line is stored in order to convey the information on SC_status bus 260. Advantageously, comparator circuits 302 are significantly smaller than full 32-bit comparators. However, dependencies are still accurately determined by the dependency checking structure Turning now to FIG. 4, a diagram depicting exemplary information stored within a reorder buffer storage location is shown. Storage location 400 is one of the storage locations in the line of storage locations 300 from FIG. 3 and includes a valid bit 401, an instruction field 402, an address field 403, a control and result field 404, an SC-hit bit 405, and an SC-way field 406. Valid bit 401 is indicative, when set, that storage location 400 is storing an instruction. Instruction field 402 stores information indicative of the type of instruction being stored. Included in instruction field 402 is an indication of any stack-relative memory accesses performed by the instruction, as well as the read/write nature of the access. Address field 403 store s an address of a memory operand for the instruction. A portion of address field 403 i s coupled to one of comparator circuits 302 (shown in FIG. 3) for performing the comparisons described above. Control and result fields 404 store various control bits associated with the instruction, as well as the result calculated by the instruction when executed.

SC-hit bit 405 is indicative, when set, of a hit in stack cache 226 by the address stored in address field 403. If SC-hit bit 405 is clear, then either the address missed in stack cache 226 or the address is not a stack-relative access. SC-way field 406 is indicative, when the SC-hit bit is set, of the way within stack cache 226 that the hit occurred in. If stack cache 226 is a direct-mapped cache, then SC-way field 406 is not included.

Turning next to FIG. 5, a diagram of the tag entry 410 stored in data cache 224 is shown. Tag entry 410 includes a tag field 411, a status field 412, an SC-hit bit 413, and an SC-way field 414. Tag field 411 stores the tag address associated with the data bytes stored in a line of data cache 224. Status field 412 stores status information for the line indicative of the validity of the line. In one embodiment, status field 412 stores values indicative of the MESI protocol for cache line validity. As will be appreciated by those skilled in the art, the MESI protocol includes four states: An invalid state indicates that the associated data bytes are invalid and should not be used (i.e. this is a cache miss). A shared state indicates that the data bytes are stored in the cache, but may also be stored in another cache within the computer system employing microprocessor 200. An exclusive state indicates that the data bytes are stored in the cache and are not stored in another cache. A Modified state indicates that the data bytes are stored in the cache and they have been changed from the values stored in main memory. A line in the modified state should be copied to main memory when removed from the cache.

SC-hit bit 413 and SC-way field 414 are similar to SC-hit bit 405 and SC-way field 406 (shown in FIG. 4). SC-hit bit 413 is set when the associated cache line is transferred to stack cache 226, and is cleared when the associated cache line is discarded from stack cache 226. Similarly, SC-way field 414 is set to the way of stack cache 226 storing the associated cache line when the associated cache line is transferred to stack cache 226.

It is noted that other aspects regarding the implementation of linear addressed caches such as instruction cache 204, data cache 224, and stack cache 226 may be found within the commonly assigned, co-pending patent application entitled: "Linearly Addressable Microprocessor Cache", Ser. No. 08/146,381, filed Oct. 29, 1993 by Witt, continued in application Ser. No. 08/506,509, now U.S. Pat. No. 5,623,619, issued Apr. 22, 1997. The disclosure of this patent application is incorporated herein by reference in its entirety.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. now abandoned. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran now U.S. Pat. No. 5,619,464, issued Apr. 8, 1997. The disclosure of this patent application is incorporated herein by reference in its entirety.

It is additionally noted that other aspects regarding superscalar microprocessors may be found in the co-pending, commonly assigned patent application entitled "Superscalar Microprocessor Including a High Performance Instruction Alignment Unit", Ser. No. 08/377,843, filed Jan. 25, 1995 by Witt, et al. now abandoned in favor of Continuation application Ser. No. 08/884,818, filed on Jun. 30, 1997. The disclosure of this patent application is incorporated herein by reference in its entirety.

It is still further noted that additional information regarding stack caches may be found in the co-pending, commonly assigned patent applications entitled: "A Method for Transferring Data Between a Pair of Caches Configured to be Accessed from Different Stages of an Instruction Processing Pipeline" by Tran, et al., filed Nov. 20, 1995, Ser. No. 08/561,073; "A Microprocessor Configured to Swap Operands in Order to Minimize Dependency Checking Logic" by Tran, filed Nov. 20, 1995, Ser. No. 08/561,030; and "A Dependency Checking Structure for a Pair of Caches Which are Accessed from Different Pipeline Stages of an Instruction Processing Pipeline" by Pflum, filed Nov. 20, 1995, Ser. No. 08/561,033. The aforementioned patent applications are filed concurrently herewith and are incorporated herein by reference in their entirety.

An exemplary listing of fast path instructions for embodiments of microprocessor 200 employing the x86 microprocessor architecture is given as table 3 below:

TABLE 3

Fast Path Listing

| x86 Assembly | Fast Path/MROM |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | fast path |
| IN | MROM |
| INC | fast path |
| INS | MROM |
| INSB | MROM |
| INSW | MROM |
| INSD | MROM |

TABLE 3-continued

Fast Path Listing

| x86 Assembly | Fast Path/MROM |
|---|---|
| INT | MROM |
| INTO | MROM |
| INVD | MROM |
| INVLPG | MROM |
| IRET | MROM |
| IRETD | MROM |
| Jcc | fast path |
| JCXZ | fast path |
| JECXZ | fast path |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | fast path |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | fast path |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | fast path |
| NEG | fast path |
| NOP | not sent to functional unit |
| NOT | fast path |
| OR | fast path |
| OUT | MROM |
| OUTS | MROM |
| OUTSB | MROM |
| OUTSW | MROM |
| OUTSD | MROM |
| POP | fast path |
| POPA | MROM |
| POPAD | MROM |
| POPF | MROM |
| POPFD | MROM |
| PUSH | fast path |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | fast path |
| RSM | MROM |
| SAHF | fast path |
| SAL | fast path |

TABLE 3-continued

Fast Path Listing

| x86 Assembly | Fast Path/MROM |
|---|---|
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

In accordance with the above disclosure a dependency checking structure for stack-relative and non-stack-relative addresses is described. The dependency checking structure advantageously enables stack-relative memory accesses to be performed earlier in the instruction processing pipeline than was previously achievable. Performance of the superscalar microprocessor may be advantageously increased due to the faster access to operands, while correct operation of the program is maintained.

Numerous variations and modifications will become apparent to those skilled in the art once the above disclosure is fully appreciated. It is intended that the following claims be interpreted to embrace all such variations and modifications.

What is claimed is:

1. A superscalar microprocessor, comprising:
   a first cache accessed from a first stage of an instruction processing pipeline or a second stage of said instruction processing pipeline;
   a second cache accessed only from said second stage of said instruction processing pipeline, wherein an instruction progressing through said instruction processing pipeline arrives at said second stage subsequent to arriving at said first stage; and
   a reorder buffer coupled to said first cache and to said second cache, wherein said reorder buffer is configured to store a plurality of memory operand address fields and an indication corresponding to each one of said plurality of memory operand address fields, wherein said indication is indicative that a first memory access corresponding to said one of said plurality of memory operand address fields hits in said first cache, wherein said reorder buffer is further configured to monitor a second memory access to said second cache, wherein said reorder buffer is further configured use the plurality of memory operand address fields to detect dependencies between said first memory access and said second memory access when said first memory access hits in said first cache, and wherein said first and said second memory accesses correspond to first and second instructions, respectively, are within a program order of instructions.

2. The superscalar microprocessor as recited in claim 1 wherein said reorder buffer is configured to discard certain instructions along with any corresponding results from said instruction processing pipeline when said first memory access is dependent upon said second memory access.

3. The superscalar microprocessor as recited in claim 2 wherein said certain instructions comprise instructions subsequent to said first instruction corresponding to said first memory access.

4. The superscalar microprocessor as recited in claim 2 wherein said reorder buffer detects a dependency if said first memory access is a read access and said second memory access is a write access.

5. The superscalar microprocessor as recited in claim 4 wherein said first instruction is subsequent to said second instruction in the program order.

6. The superscalar microprocessor as recited in claim 5 wherein said first memory access and said second memory access both access a particular byte of memory.

7. The superscalar microprocessor as recited in claim 1 wherein said reorder buffer is configured to stall said second memory access when said second memory access is dependent upon said first memory access.

8. The superscalar microprocessor as recited in claim 7 wherein said reorder buffer detects a dependency if said first memory access is a write memory access and said second memory access is a read memory access.

9. The superscalar microprocessor as recited in claim 8 wherein said first instruction is prior to said second instruction in the program order.

10. The superscalar microprocessor as recited in claim 9 wherein said first memory access and said second memory access both access a particular byte of memory.

11. The superscalar microprocessor as recited in claim 1 wherein said indication further indicates a way of said first cache in which said first memory access hits.

12. The superscalar microprocessor as recited in claim 11 wherein said reorder buffer detects dependencies by comparing a first memory operand address field associated with said first memory access to a corresponding second memory operand address field associated with said second memory access.

13. The superscalar microprocessor as recited in claim 12 wherein said reorder buffer detects dependencies if said comparison indicates equality, said first memory access hits in said first cache, and said second memory access hits in said first cache.

14. The superscalar microprocessor as recited in claim 13 wherein said reorder buffer detects dependencies if said first memory access and said second memory access hit in the same way of said first cache.

15. The superscalar microprocessor as recited in claim 1, wherein said first stage of said instruction processing pipeline comprises a decode stage of said instruction processing pipeline, and wherein said second stage of said instruction processing pipeline comprises an execution stage of said instruction processing pipeline.

16. The superscalar microprocessor as recited in claim 15, further comprising:

a decode unit coupled to said first cache, wherein said first memory access is performed by said decode unit, and a load/store unit coupled to said first cache and said second cache, wherein said second memory access is performed by said load/store unit.

17. The superscalar microprocessor as recited in claim 16, wherein said first cache comprises a stack cache, and wherein said second cache comprises a data cache.

18. The superscalar microprocessor as recited in claim 17 wherein said decode unit performs memory accesses to said stack cache, and wherein said load/store unit performs memory accesses to said stack cache and said data cache.

19. A method of avoiding data dependencies in a microprocessor containing a stack cache and a data cache comprising:

accessing said stack cache during a decode stage of an instruction processing pipeline using a first memory operand address field;

accessing said stack cache and said data cache during an execution stage of an instruction processing pipeline using a second memory operand address field;

comparing said first and second memory operand address fields;

stalling a first read memory access performed during said execution stage that is dependent upon a first write memory access performed during said decode stage until said first write memory access is completed; and flushing one or more instructions associated with a second read memory access performed during said decode stage that is dependent upon a second write memory access performed during said execution stage, wherein flushing comprises discarding said one or more instructions along with a corresponding result.

* * * * *